(12) United States Patent
Manpuku et al.

(10) Patent No.: US 6,305,657 B1
(45) Date of Patent: Oct. 23, 2001

(54) MECHANISM FOR TILTING A MICROSCOPE

(75) Inventors: Yasuhiro Manpuku, Ome; Kazunori Hiranuma; Mamoru Takashina, both of Hachioji, all of (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 0 days.

(21) Appl. No.: 09/365,606

(22) Filed: Aug. 2, 1999

(30) Foreign Application Priority Data

Dec. 10, 1998 (JP) .................................................. 10-351507

(51) Int. Cl.⁷ ...................................................... A47G 29/00
(52) U.S. Cl. ...................... 248/371; 248/288.51; 324/758
(58) Field of Search ................................ 248/371, 372.1, 248/395, 398, 370, 354.3, 354.4, 354.5, 133, 288.51, 289.31, 292.13, 594, 586, 587, 620, 758; 324/758, 754, 756, 757

(56) References Cited

U.S. PATENT DOCUMENTS

| | | | | |
|---|---|---|---|---|
| 4,462,187 | * | 7/1984 | Dunn ...................................... | 451/262 |
| 4,770,382 | * | 9/1988 | Lehti .................................. | 248/371 X |
| 4,796,508 | * | 1/1989 | Hoshino ....................... | 248/288.51 X |
| 5,145,137 | * | 9/1992 | Choi ................................. | 248/288.51 |
| 5,342,015 | * | 8/1994 | Burton et al. ......................... | 248/478 |
| 5,382,806 | * | 1/1995 | Bacchi et al. ......................... | 250/561 |
| 5,642,056 | * | 6/1997 | Nakajima et al. ..................... | 324/758 |
| 5,740,953 | * | 4/1998 | Smith et al. ............................. | 225/2 |
| 5,763,965 | * | 6/1998 | Bader ..................................... | 310/12 |
| 6,023,068 | * | 2/2000 | Takahashi .......................... | 250/492.2 |
| 6,060,892 | * | 5/2000 | Yamagata ............................. | 324/754 |
| 6,122,036 | * | 9/2000 | Yamasaki et al. ..................... | 355/53 |
| 6,140,828 | * | 10/2000 | Iino et al. ............................. | 324/758 |

FOREIGN PATENT DOCUMENTS 59 177928 A 10/1984 (JP) .
62 241329 A 10/1987 (JP) .

* cited by examiner

Primary Examiner—Leslie A. Braun
Assistant Examiner—Tan Le
(74) Attorney, Agent, or Firm—Christie, Parker & Hale, LLP

(57) ABSTRACT

A mechanism for tilting a microscope in which a tilting base 5 is supported by a tilting sub-base 4 at three points, and is urged toward the tilting sub-base at all times by the resilient force of initially coned disc springs 23 fitted to support bolts 20. Adjusting bolts 30 are used for the support at three points, and steel balls 34 are interposed between the lower parts of the bolts and the tilting sub-base, so that the tilting base is supported by the tilting sub-base.

11 Claims, 12 Drawing Sheets

MECHANISM FOR TILTING A MICROSCOPE

BACKGROUND OF THE INVENTION

1. Field of the Invention

The present invention relates to a mechanism for tilting a microscope used for an appearance inspection device capable of inspecting wafers in a process such as during the production of semiconductor devices, after the formation of thin films, after etching or after washing.

2. Description of the Related Art

Objects of which the appearance is to be inspected in the IC process chiefly include photomasks, wafers and reticules. In inspecting pattern defects on the wafers, a microscope is generally and widely used for inspecting irregular line widths, scars, missing portions on the patterns that cannot be discovered by the inspection of electric properties, and for sampling inspection during the production steps.

A wafer is usually inspected by using a microscope in a manner as shown in FIG. 12. That is, a wafer 3 to be inspected is secured, by vacuum gripping or a similar method, onto a wafer chuck 2 provided on a moving stage 1 that is allowed to move in the x-direction, Y-direction and Z-direction and to rotate in θ-direction. Over the wafer, a microscope 7 is placed via a tilting sub-base, a tilting base 5 and a plate 6. The microscope is provided with plural kinds of objectives 8, and a predetermined objective is brought to an inspection position on the wafer that is to be inspected by revolving an electrically-driven revolver 9.

To vividly and correctly catch the image on the wafer, the optical axis of the objective must be at right angles with the surface of the wafer. Therefore, a tilting mechanism is provided for adjustment. There has heretofore been employed a tilting mechanism shown in FIGS. 13 and 14. In order to support the tilting base 5 and the tilting sub-base 4 while maintaining a gap, the tilting mechanism is provided with gap-adjusting means comprising a pair of a fastening bolt 10 and a set screw 11 at four corners. The tilting base 5 has through holes larger than the outer diameter of the bolt for passing the fastening bolt 10 therethrough but smaller than the head of the fastening bolt, and further has threaded holes for the set screws 11 neighboring the through holes. The tilting sub-base 4 has threaded holes for receiving the fastening bolts 10, and the set screws 11 are set onto the tilting sub-base 4.

To expand the gap between the tilting base 5 and the tilting sub-base 4 in this tilting mechanism, the fastening bolt 10 is turned and is lifted up to create a gap between the lower surface of the head of the fastening bolt and the upper surface of the tilting base. In this state, the set screw 11 is turned to raise the tilting base 5 so that it comes in contact with the lower surface of the head of the fastening bolt. To narrow the gap, the set screw 11 is turned in the reverse direction to lower the tilting base 5 and, then, the fastening bolt is also turned reverse so as to be screwed therein.

Relying on the operations of both the fastening bolt 10 and the set screw 11 as described above, the gap is adjusted at one corner between the tilting base 5 and the tilting sub-base 4. Since the supports exist at four points, this operation for adjustment must be executed at all of four points at four corners, which is very cumbersome. This difficulty in the adjustment makes it impossible to accomplish fine adjustment. Also, a change takes place with the passage of time since there remains a large residual stress after the fastening by using the fastening bolts and set screws.

SUMMARY OF THE INVENTION

The present invention was accomplished in view of the problems inherent in the conventional mechanism for tilting a microscope, and its object is to easily carry out the adjustment operation for accomplishing a right-angled relationship between the surface of an object to be inspected and the optical axis of an objective, and for accomplishing a fine and correct adjustment, eliminating a change with the passage of time after the adjustment.

In a mechanism for tilting a microscope according to an embodiment of the present invention, a tilting base and a tilting sub-base are supported at three points, and the tilting base is urged toward the tilting sub-base at all times by springs interposed between support bolts and the tilting base, to easily accomplish fine and correct tilting adjustment.

In a mechanism for tilting a microscope according to the present invention, many initially coned disc springs are used to produce resilient urging force for a heavy load.

In a mechanism for tilting a microscope according to the present invention, one point among the three points serves as a center of the side edge and is used as a reference point for fastening.

In a mechanism for tilting a microscope according to the present invention, the three support points are constituted by a conical receptacle and a steel ball to support the load, by line contact, while providing endurance against a heavy load.

In a mechanism for tilting a microscope according to the present invention, a facing on the tilted sub-base corresponding to a third adjusting bolt is formed like an elongated groove along a line connecting a first adjusting bolt to the third adjusting bolt to cancel the deviating force between the tilting base and the tilting sub-base that stems from the rotational force of the third adjusting bolt at the time of adjusting the tilt.

In a mechanism for tilting a microscope according to the present invention, cylindrical members are fitted to the tilting base so that the second and third adjusting belts can be screwed therein, eliminating the need of forming a screw thread in the tilting base and the need of replacing the tilting base, which is an important component, despite the screw thread being flattened after repetitions of the tilting adjustment, but only requiring the replacement of the cylindrical members to offer an advantage in maintenance and cost.

In a mechanism for tilting a microscope according to the present invention, a facing corresponding to a second adjusting bolt is formed in a ball receptacle which is allowed to slide on the tilting sub-base, to comply with the motion produced by the turn of the third adjusting bolt and to comply with the attitude of the second adjusting bolt.

In a mechanism for tilting a microscope according to the present invention, a leaf spring is provided between the side edges of the tilting base and the tilting subbase to prevent the deviation between the two.

The present invention may be more fully understood from the description of the preferred embodiments of the invention set forth below together with the accompanying drawings.

DESCRIPTION OF THE PREFERRED EMBODIMENTS

Figure 1:
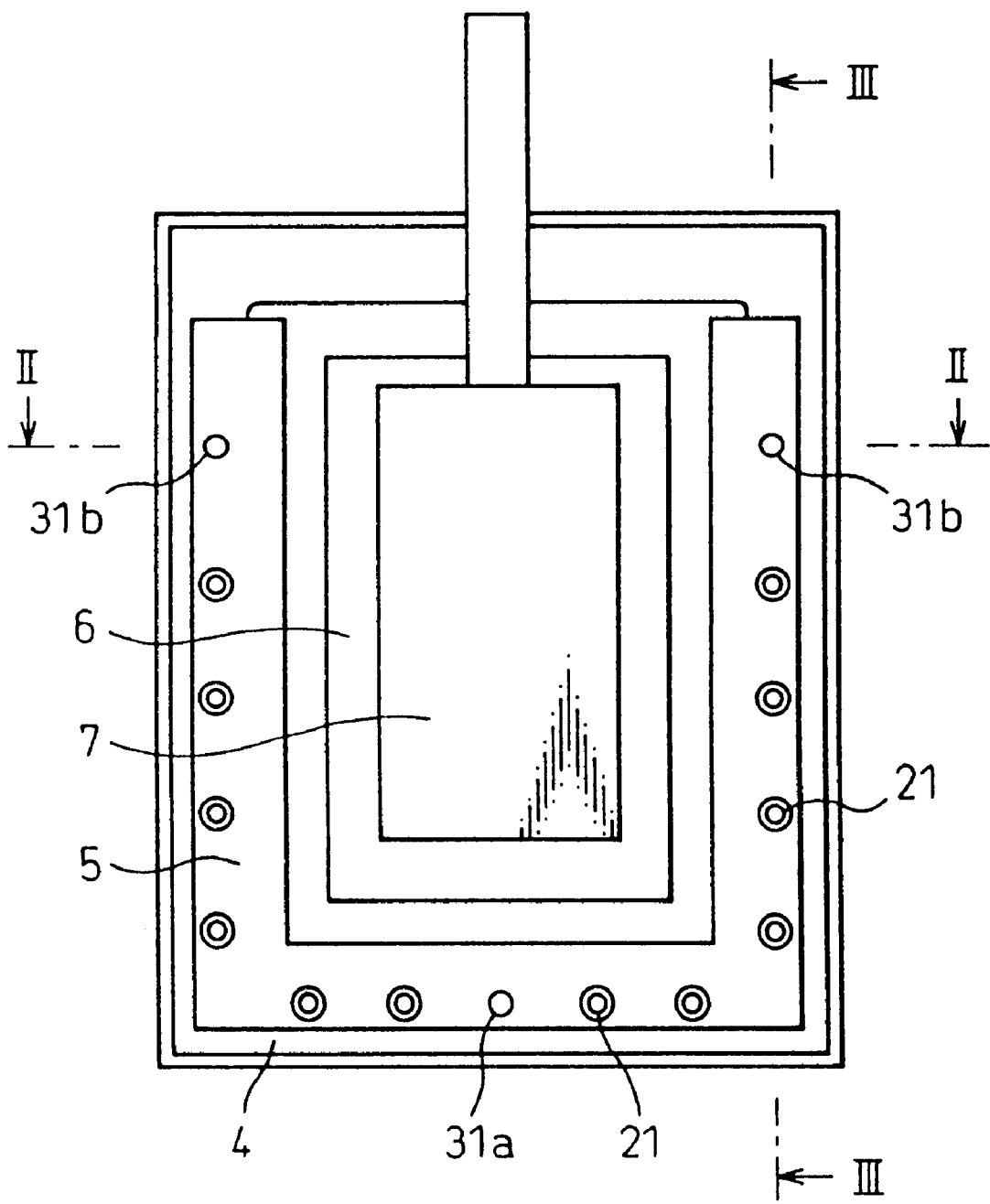
FIG. 1 is a plan view illustrating a mechanism for tilting a microscope according to an embodiment of the present invention.
Figure 2:
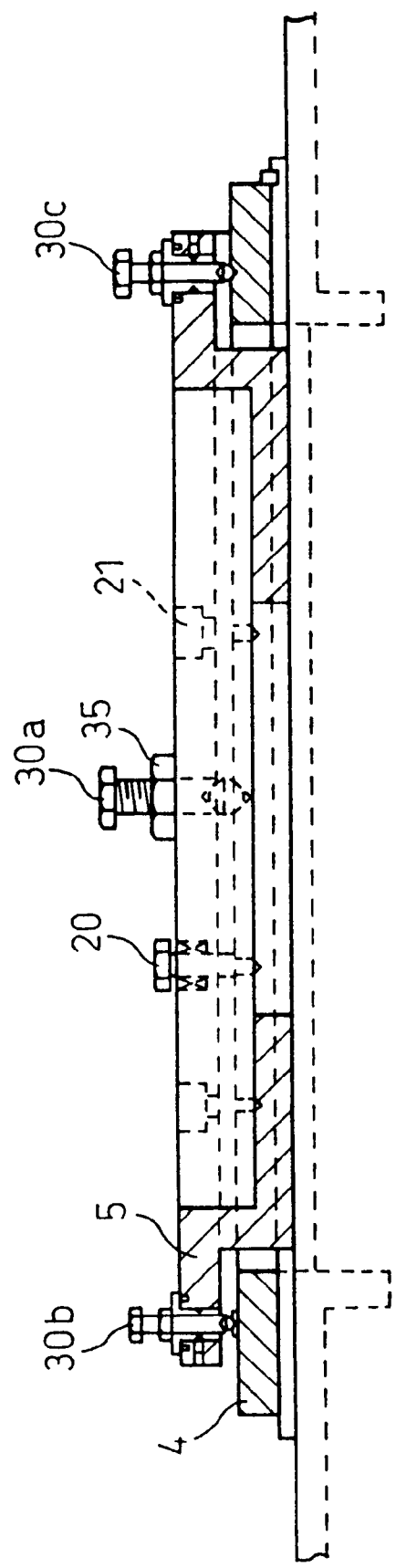
FIG. 2 is a sectional view illustrating the mechanism for tilting a microscope along the line II-II in FIG. 1, omitting the microscope and a plate to allow a simple explanation.
Figure 3:
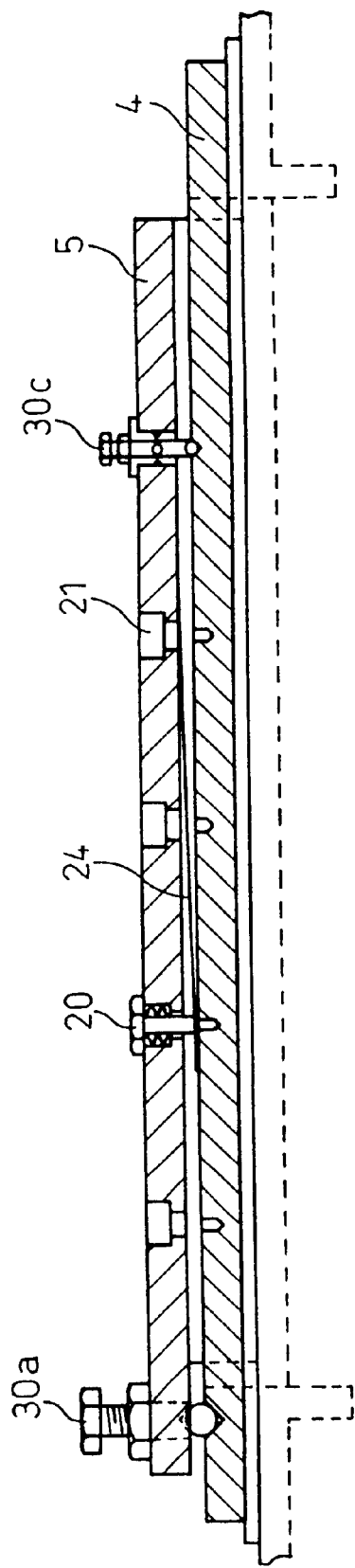
FIG. 3 is a sectional view illustrating the mechanism for tilting a microscope along the line III-III in FIG. 1, omitting the microscope and a plate to allow a simple explanation.

Described below is a mechanism for tilting a microscope according to an embodiment of the present invention. FIG. 1 is a plan view illustrating the mechanism for tilting a microscope according to the present invention. Like in the prior art, a tilting base 5 is placed on a tilting sub-base 4, and a plate 6 mounting a microscope 7 is placed thereon. FIG. 2 is a sectional view of the tilting mechanism along the line II—II in FIG. 1, and FIG. 3 is a sectional view thereof along the line III—III in FIG. 1, without showing the plate 6 and the microscope 7 to clearly illustrate the tilting mechanism. FIG. 2 illustrates first to third adjusting bolts 30a, 30b, 30c and support bolt 20 that are screwed, and FIG. 3 illustrates two adjusting bolts 30a, 30c and support bolt 20 that are screwed.

Figure 4:
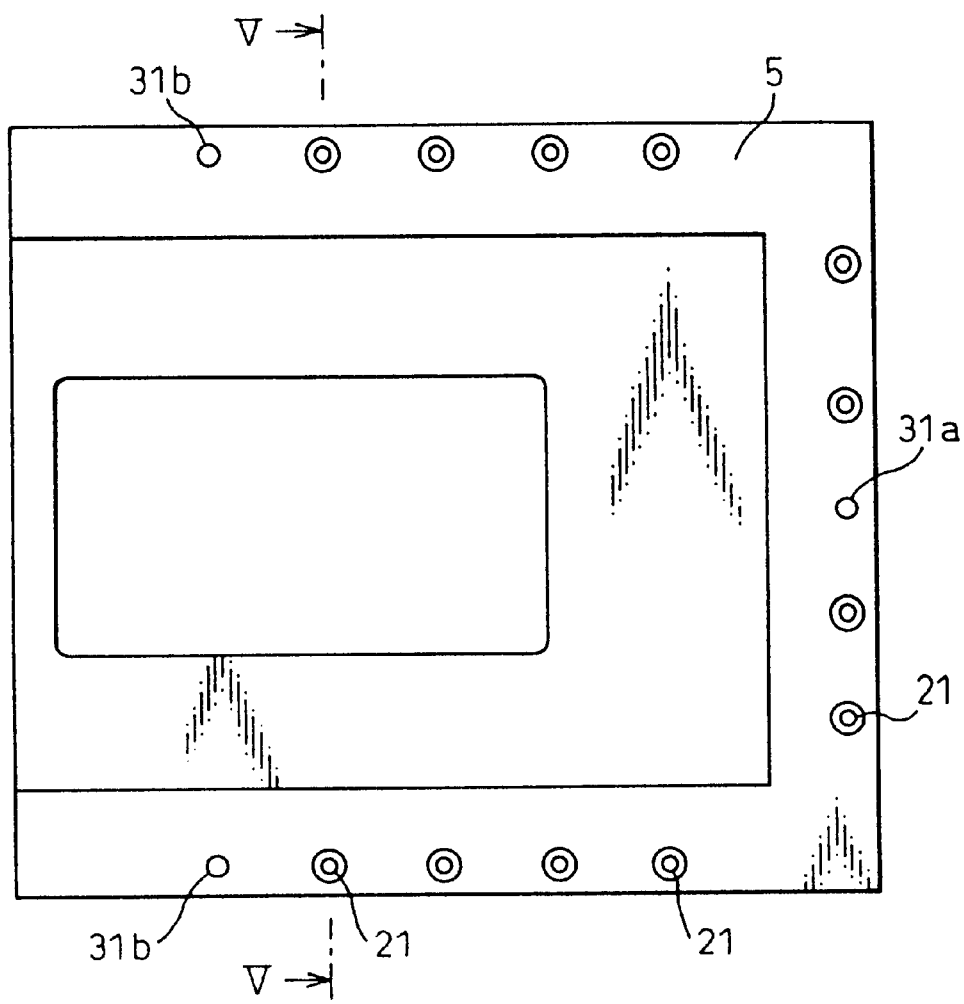
FIG. 4 is a plan view of a tilting base used for the mechanism for tilting a microscope according to the present invention.
Figure 5:
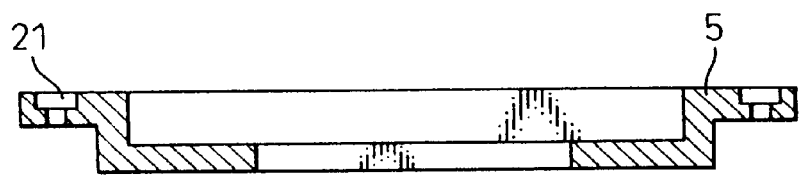
FIG. 5 is sectional view of the tilting base along the line V—V in FIG. 4.

FIG. 4 is a plan view of the tilting base 5, and FIG. 5 is a sectional view of the tilting base along the line V—V in FIG. 4. As will be understood from FIGS. 4 and 5, the tilting base 5 has a rectangular shape with its three side edges protruding beyond the central portion, and has an opening in the central portion thereof for installing the microscope. The tilting base 5 further has four openings 21 for the support bolts 20 and an opening 31 for an adjusting bolt 30 formed in each of its three side edges. The opening 31a for the first adjusting bolt 30a is perforated at the center in the central side edge, and the openings 31b for the second and third adjusting bolts 30b and 30c are perforated in the right and left side edges at an equal distance from the first adjusting bolt 30a that serves as the reference.

Figure 6:
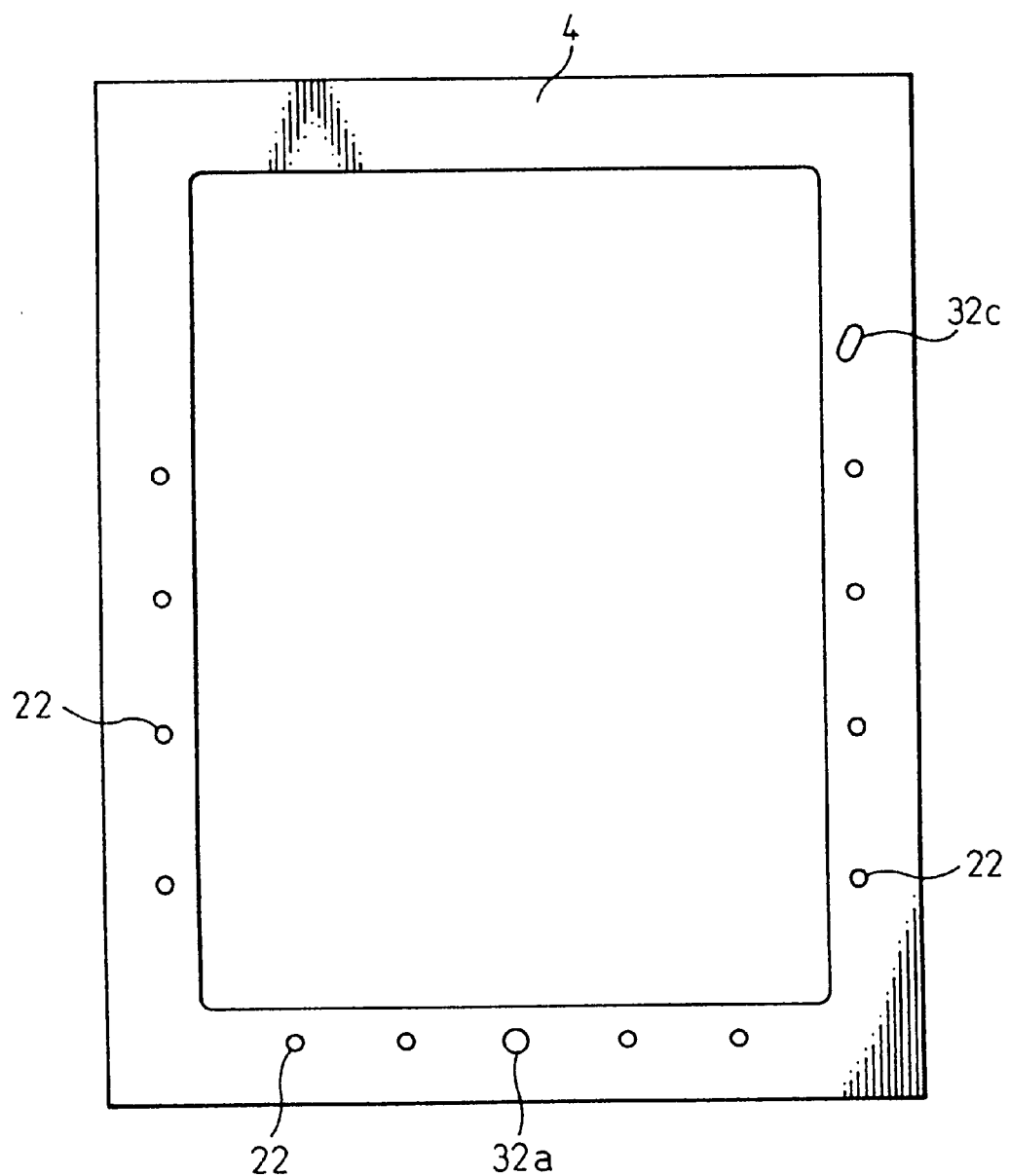
FIG. 6 is a lan view of a tilting sub-base used for the mechanism f tilting a microscope according to the present invention.

FIG. 6 is a plan view of the tilting sub-base. The tilting sub-base 4 has a square shape and has four threaded holes 22, for the support bolts 20, formed in each of its three side edges corresponding to the three side edges of the tilting base 5, a conical facing 32a at a position corresponding to the first reference adjusting bolt 30a, and an elongated groove 32c at a position corresponding to the third adjusting bolt 30c, the elongated groove 32c having a semiconical shape at its both ends and a V-shape in cross section at an intermediate portion thereof along the line connecting the first adjusting bolt to the third adjusting bolt as shown in FIG. 6.

Figure 7:
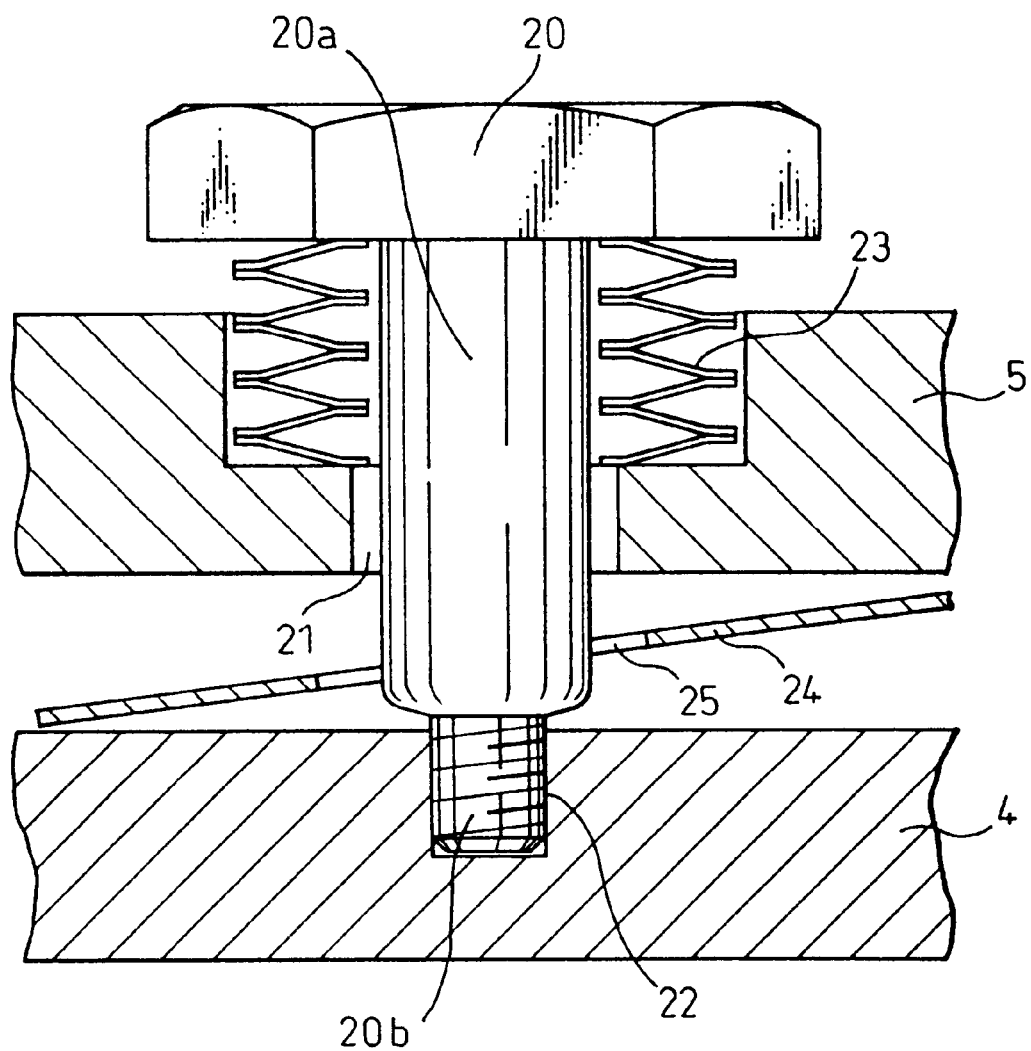
FIG. 7 is a sectional view illustrating, on an enlarged scale, the constitution for installing a support bolt of the mechanism for tilting a microscope according to the present invention.

FIG. 7 is a sectional view illustrating, on an enlarged scale, the structure for installing the support bolt 20. The support bolt 20 has an unthreaded portion 20a of a large diameter and a threaded portion 20b of a small diameter. The opening 20 in the tilting base 5 for the support bolt 20 is formed in a stepped manner having a large-diameter portion and a small-diameter portion larger than the diameter of the unthreaded portion 20a. In this stepped portion is incorporated a spring comprising a plurality of initially coned disc springs 23 constituted like counter balls of an abacus. The small-diametered threaded portion 20b at an end of the support bolt 20 is screwed into the threaded hole 22 in the tilting sub-base 4 penetrating through an elongated hole 25 in a leaf spring 24 interposed between the tilting base 5 and the tilting sub-base 4. Therefore, the tilting base 5 is urged toward the tilting sub-base 4 at all times by the urging force of the initially coned disc springs 23.

In this embodiment, the support bolts are provided in a number of four on each side edge. This number, however, can be suitably changed.

Figure 8:
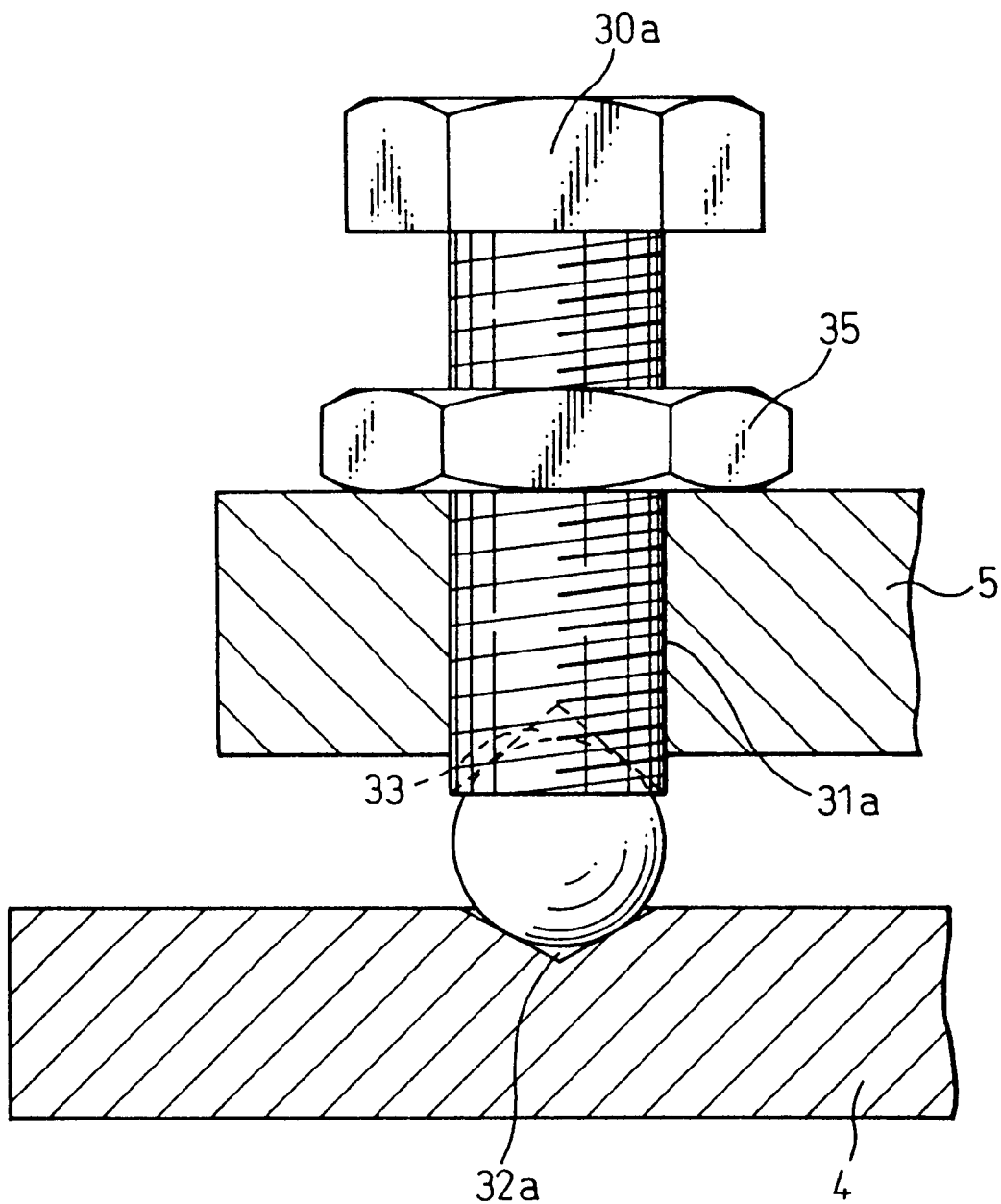
FIG. 8 is a sectional view illustrating, on an enlarged scale, the constitution for installing a first adjusting bolt that serves as a reference for the mechanism for tilting a microscope according to the present invention.
Figure 9:
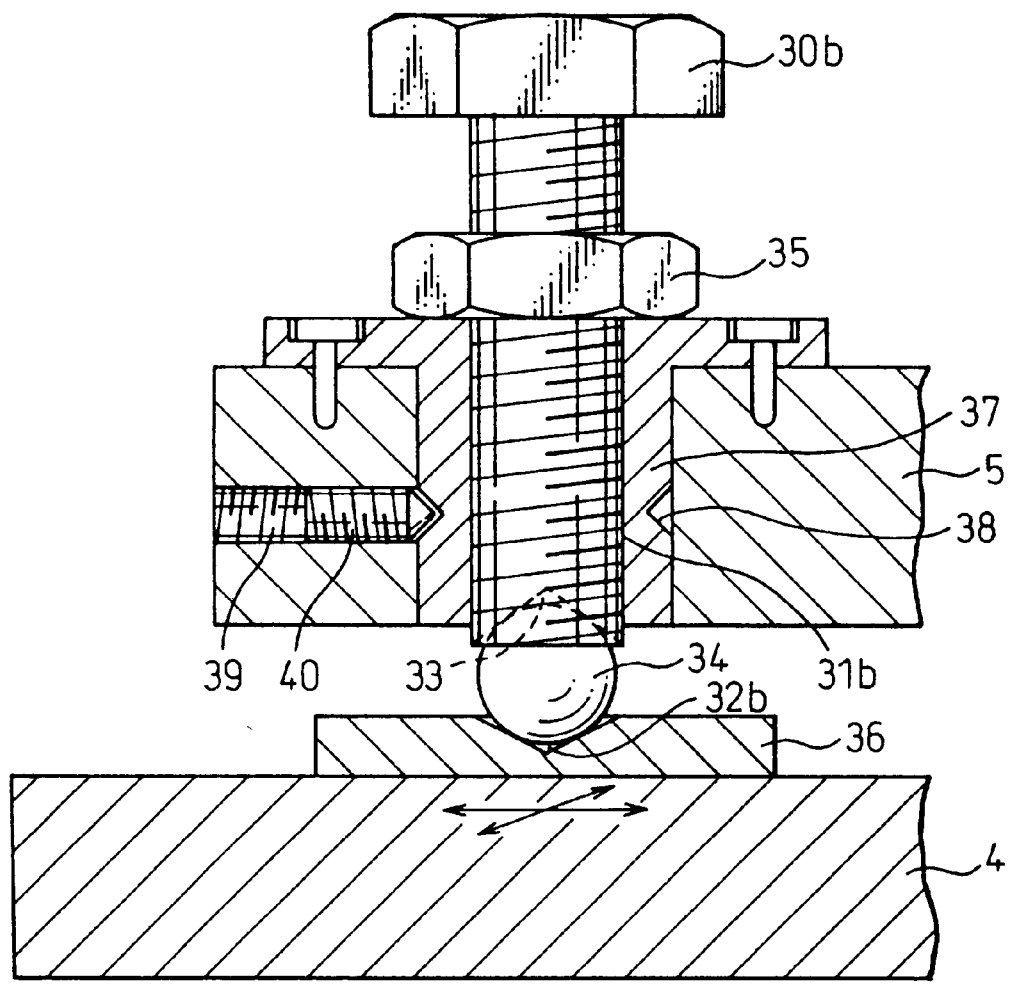
FIG. 9 is a sectional view illustrating, on an enlarged scale, the constitution for installing a second adjusting bolt of the mechanism for tilting a microscope according to the present invention.
Figure 10:
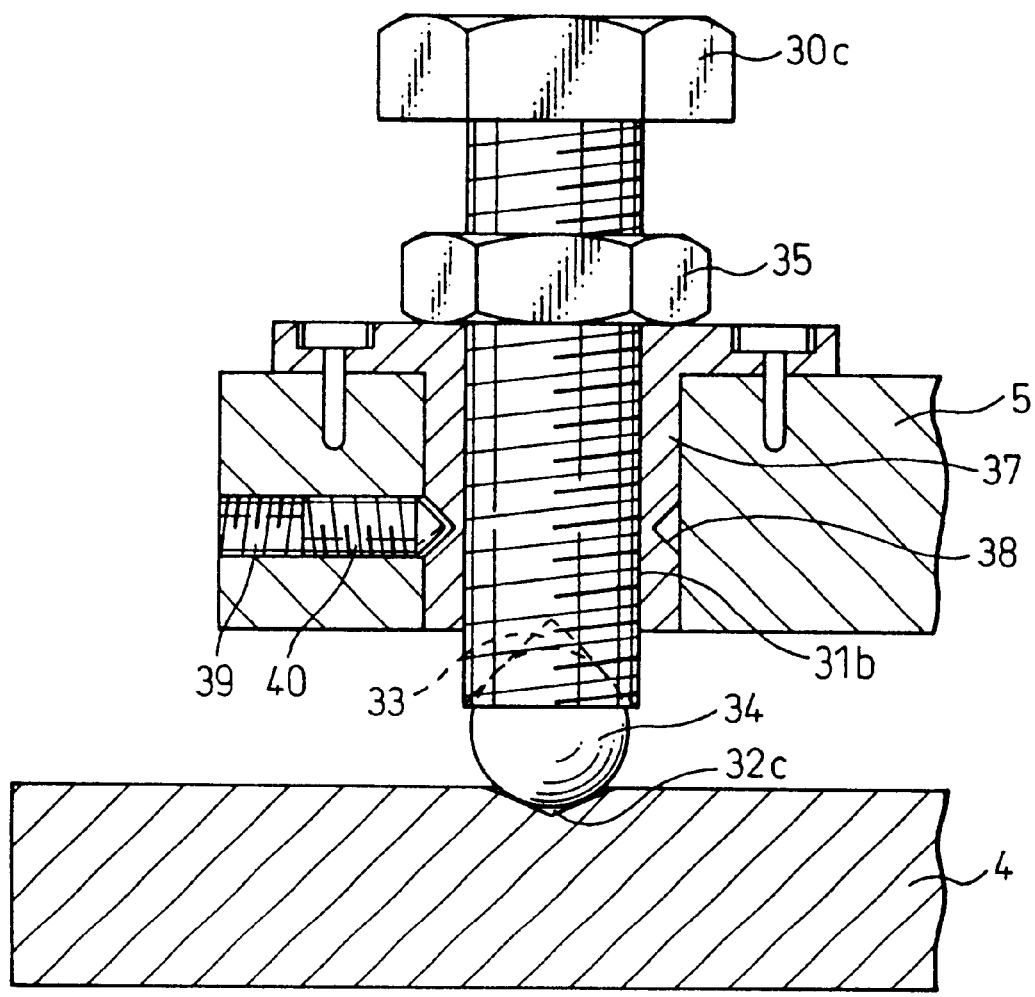
FIG. 10 is a sectional view illustrating, on an enlarged scale, the constitution for installing a third adjusting bolt the mechanism for tilting a microscope according to present invention.

Next, described below with reference to FIGS. 8, 9 and 10 is the structure for installing the adjusting bolt 30. FIG. 8 is a sectional view illustrating, on an enlarged scale, the structure for installing the first adjusting bolt 30a that serves as a reference. The tilting base 5 has an opening 31 (threaded hole) formed in the central portion of the side edge thereof and into which will be screwed the first adjusting bolt 30a. A conical facing 32a is formed in the tilting sub-base 4 at a position corresponding to the first adjusting bolt 30a. A conical recessed portion 33 is formed in the end of the first adjusting bolt 30a, and a steel ball 34 is held between the recessed portion 33 and the facing 32a. There is further provided a lock nut 35 for locking the first adjusting bolt 30a.

FIG. 9 is a sectional view illustrating, on an enlarged scale, the structure for installing the second adjusting bolt 30b. Like in the first adjusting bolt, a conical recessed portion 33 is formed in the end of the second adjusting bolt 30b having a screw thread of a pitch as small as from about 0.35 mm to about 0.5 mm, and a steel ball 34 is held between the recessed portion 33 and a conical facing 32b formed in a ball receptacle 36 that is placed on the tilting sub-base 4 and is allowed to slide in the four directions. A cylindrical member 37 is fitted into the opening 31b of the tilting base 5, the cylindrical member 37 having a screw thread formed in the inner peripheral surface thereof so that the second adjusting bolt 30b can be screwed therein. The cylindrical member 37 has a ring-like flange formed at one end thereof so as to be secured to the tilting base 5 by the bolt. A groove 38 having a V-shape in cross section is formed like a ring along the outer circumference of the cylindrical member 37, and a conical end of a set screw 40 driven through a lateral hole 39 formed in the tilting base 5 comes into engagement with the groove 38. The cylindrical member 37 is pushed downward upon the engagement of a tilted surface at the conical end of the set screw 40 and a tilted surface of the groove 38. Like the first adjusting bolt 30a, the second adjusting bolt 30b is provided with a lock nut 35 to lock the second adjusting bolt 30b at a suitable position.

FIG. 10 is a sectional view illustrating, on an enlarged scale, the structure for installing the third adjusting bolt 30c. This installation structure is basically the same as the structure for installing the second adjusting bolt 30b but is different in that there is no ball receptacle 36 and the facing is formed in a different shape. The facing corresponding to the third adjusting bolt 30c is formed directly in the tilting sub-base 4, and has the shape of an elongated groove 32c with a semiconical shape at its both ends and a V-shape in cross section at an intermediate portion thereof, the facing being formed along the line connecting the first adjusting bolt 30a to the third adjusting bolt 30c as shown in FIG. 6. With the facing for the steel ball 34 being formed like an elongated groove 32c, the ball 34 produces a force to move along the elongated groove, and the deviating force between the tilting base 5 and the tilting sub-base is canceled, that is produced by the rotational force accompanying the turn of the third adjusting bolt 30c at the time of adjusting the tilt.

Figure 11:
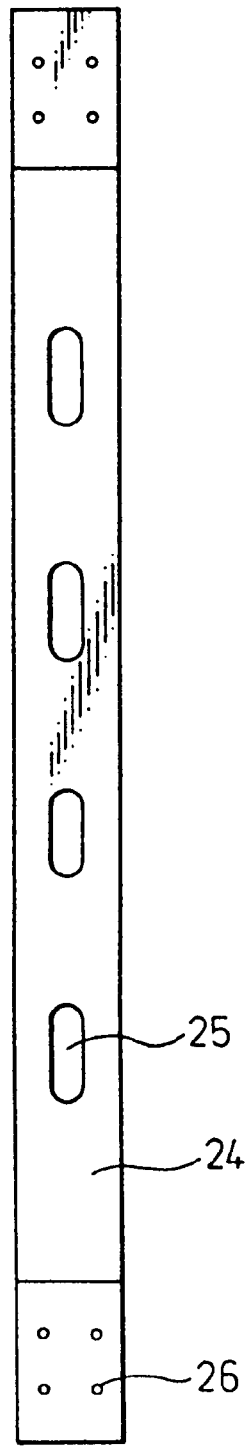
FIG. 11 is a plan view of a leaf spring used for the mechanism for tilting a microscope according to the present invention.
Figure 12:
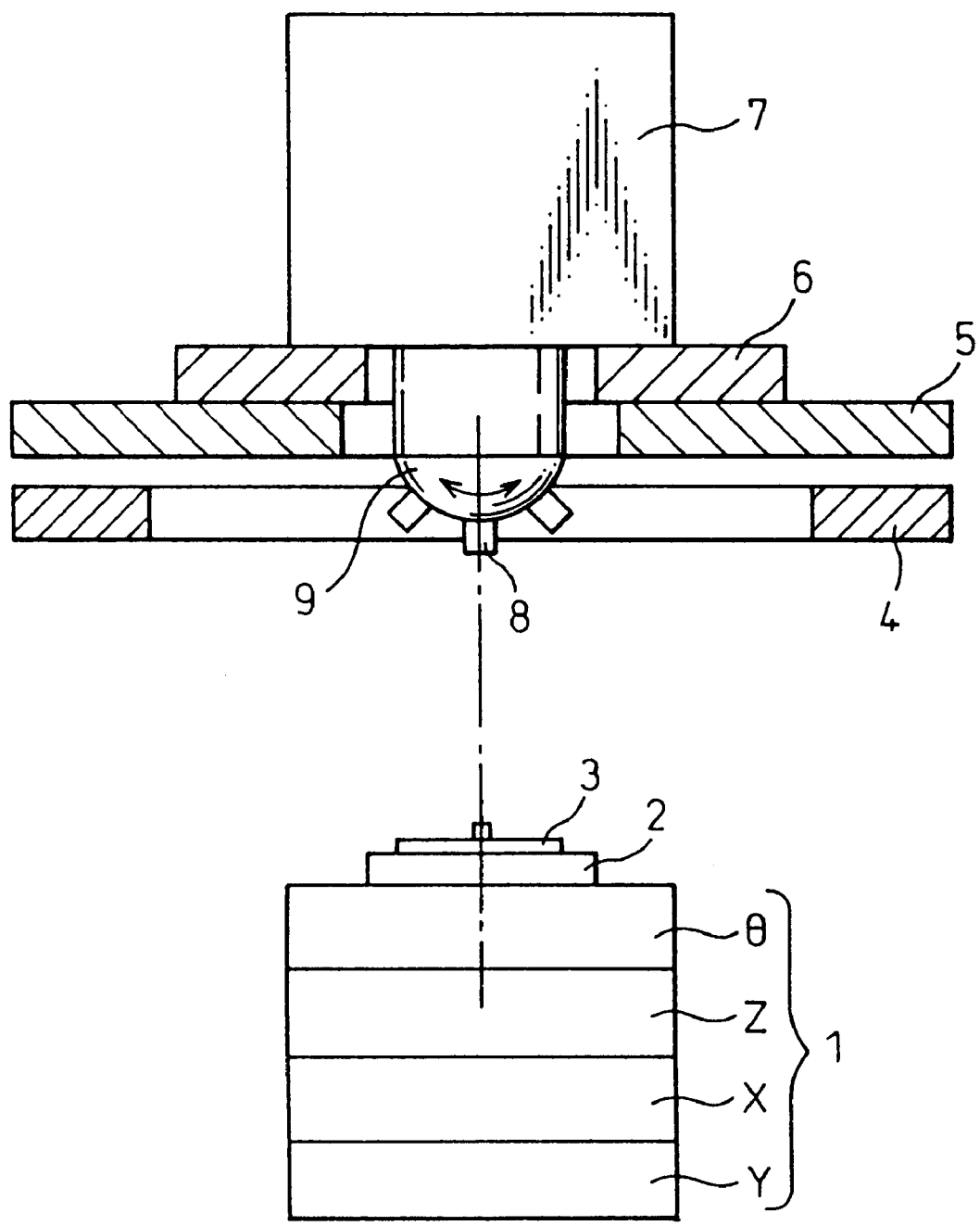
FIG. 12 is a view schematically illustrating the mechanism for tilting a microscope used for a device for inspecting semiconductor wafers.
Figure 13:
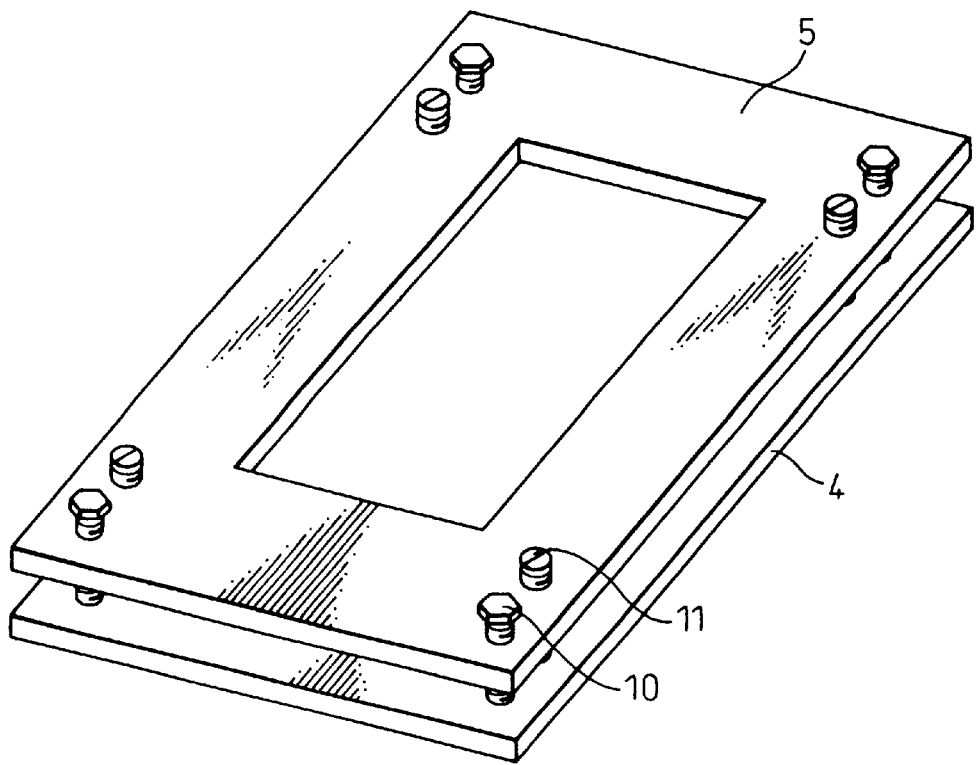
FIG. 13 is a perspective view schematically illustrating a conventional device for tilting a microscope.
Figure 14:
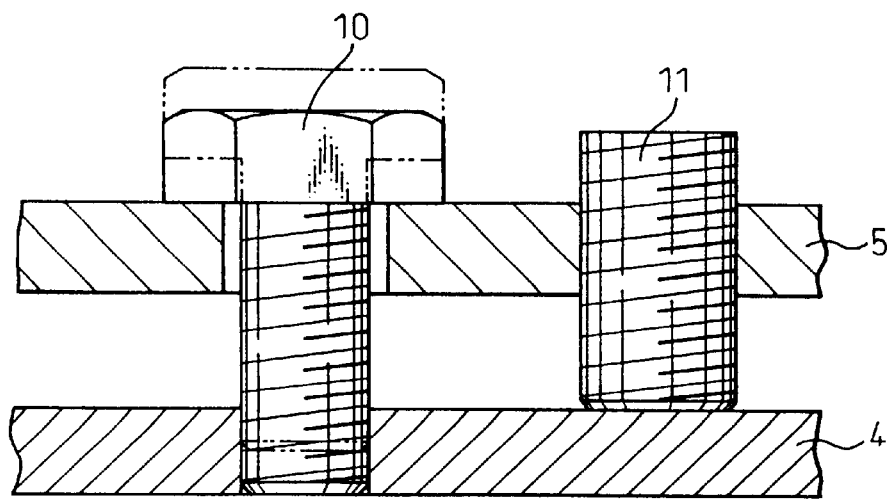
FIG. 14 is a vertical sectional view illustrating, on an enlarged scale, the mechanism for tilting a microscope of FIG. 13.

FIG. 11 is a plan view of a leaf spring 24 interposed between the side edges of the tilting base 5 and the tilting sub-base 4. In the leaf spring 24 are perforated elongated holes 25 through which the support bolts 20 pass through, and small holes 26 for rivetting for securing the leaf spring to the tilting base and to the tilting sub-base. The leaf spring 24 helps prevent the deviation between the tilting base and the tilting sub-base.

It is further desired that the mechanism for tilting the microscope of the present invention is made of a low-expansion material which is affected little by a change in the temperature, since vigorous heat cycles produce deviation.

To adjust the tilt by using the thus constituted mechanism for tilting the microscope according to the present invention, the first adjusting bolt is secured as a reference point, and the second or the third adjusting bolt is turned.

According to the mechanism for tilting the microscope of the present invention as described above, the tilt adjustment is easily accomplished by turning one or two adjusting bolts only. Besides, deviation is prevented between the tilting base and the tilting subbase to accomplish fine adjustment. The mechanism withstands a heavy load owing to its support based on the line contact using the conical receptacles and the steel balls. Furthermore, the tilting base is not provided with a screw thread into which the adjusting bolt will be screwed for repetitively effecting the tilt adjustment. Therefore, it does not happen that the screw thread is flattened, and the tilting base need not be replaced but only the cylindrical member may be replaced, offering advantage in maintenance. Besides, the tilting base is urged by the springs at all times, eliminating a change with the passage of time after the adjustment.

While the invention has been described by reference to specific embodiments chosen for purposes of illustration, it should be apparent that numerous modifications could be made thereto by those skilled in the art without departing from the basic concept and scope of the invention.

What is claimed is:

1. A mechanism for tilting a microscope used for an apparatus for producing semiconductor devices, comprising:

a plate on which the microscope is placed, a tilting base to which said plate is secured, the tilting base having three side edges, and a tilting sub-base for supporting said tilting base along the side edges thereof, wherein said tilting base is urged toward said tilting sub-base at all times due to springs interposed between said tilting base and a plurality of support bolts provided along the side edges of said tilting base, and, similarly, said tilting base is supported at three points by said tilting sub-base by using three adjusting bolts provided in a number of one at each of the three side edges of said tilting base, and wherein a conical recessed portion is formed in an end of each of said three adjusting bolts, a facing is formed in said tilting sub-base and in a ball receptacle, and a steel ball is disposed between one of said recessed portions and one of said facings.

2. A mechanism for tilting a microscope according to claim 1, wherein a facing is formed in said tilting sub-base at a position corresponding to a third adjusting bolt of the three adjusting bolts along the line connecting a first adjusting bolt of the three adjusting bolts to said third adjusting bolt, said facing having the shape of an elongated groove with a semiconical shape at its both ends and a V-shape in cross section at an intermediate portion thereof.

3. A mechanism for tilting a microscope used for an apparatus for producing semiconductor devices, comprising:

a plate on which the microscope is placed, a tilting base to which said plate is secured, the tilting base having three side edges, and a tilting sub-base for supporting said tilting base along the side edges thereof, wherein said tilting base is urged toward said tilting sub-base at all times due to springs interposed between said tilting base and a plurality of support bolts provided along the side edges of said tilting base, and, similarly, said tilting base is supported at three points by said tilting sub-base by using three adjusting bolts provided in a number of one at each of the three side edges of said tilting base, and wherein a first adjusting bolt of the three adjusting bolts is arranged at a center on one side edge of said tilting base, and a second adjusting bolt of the three adjusting bolts and a third adjusting bolt of the three adjusting bolts are arranged on second and third side edges continuous to both ends of said one side edge at positions of an equal distance from said first adjusting bolt, and wherein a conical recessed portion is formed in an end of each of said three adjusting bolts, a facing is formed in said tilting sub-base and in a ball receptacle, and a steel ball is disposed between one of said recessed portions and one of said facings.

4. A mechanism for tilting a microscope according to claim 3, wherein a facing having two ends is formed in said tilting sub-base at a position corresponding to said third adjusting bolt along a line connecting said first adjusting bolt to said third adjusting bolt, said facing having the shape of an elongated groove with a semiconical shape at its both ends and a V-shape in cross section at an intermediate portion thereof.

5. A mechanism for tilting a microscope according to claim 4, wherein said second and third adjusting bolts have cylindrical members fitted into said tilting base so that said second and third adjusting bolts can be screwed therein, as well as set screws for fastening said cylindrical members and lock nuts for securing said adjusting bolts.

6. A mechanism for tilting a microscope according to claim 4, wherein a facing for said second adjusting bolt is formed in said ball receptacle that is mounted on said tilting sub-base so as to slide in four directions.

7. A mechanism for tilting a microscope according to claim 3, wherein said second and third adjusting bolts have cylindrical members fitted into said tilting base so that said second and third adjusting bolts can be screwed therein, as well as set screws for fastening said cylindrical members and lock nuts for securing said adjusting bolts.

8. A mechanism for tilting a microscope according to claim 3, wherein a facing for said second adjusting bolt is formed in said ball receptacle that is mounted on said tilting sub-base so as to slide in four directions.

9. A mechanism for tilting a microscope used for an apparatus for producing semiconductor devices, comprising:

a plate on which the microscope is placed, a tilting base to which said plate is secured, the tilting base having three side edges, and a tilting sub-base for supporting said tilting base along the side edges thereof, wherein said tilting base is urged toward said tilting sub-base at all times due to springs interposed between said tilting base and a plurality of support bolts provided along the side edges of said tilting base, and, similarly, said tilting base is supported at three points by said tilting sub-base by using three adjusting bolts provided in a number of one at each of the three side edges of said tilting base, and wherein a first adjusting bolt of the three adjusting bolts is arranged at a center on one side edge of said tilting base, and a second adjusting bolt and a third adjusting bolt of the three adjusting bolts are arranged on second and third side edges continuous to both ends of said one side edge at positions of an equal distance from said first adjusting bolt, and wherein said second and third adjusting bolts have cylindrical members fitted into said tilting base so that said second and third adjusting bolts can be screwed therein, as well as set screws for fastening said cylindrical members and lock nuts for securing said adjusting bolts.

10. A mechanism for tilting a microscope used for an apparatus for producing semiconductor devices, comprising:

a plate on which the microscope is placed, a tilting base to which said plate is secured, the tilting base having three side edges, and a tilting sub-base for supporting said tilting base along the side edges thereof, wherein said tilting base is urged toward said tilting sub-base at all times due to springs interposed between said tilting base and a plurality of support bolts provided along the side edges of said tilting base, and, similarly, said tilting base is supported at three points by said tilting sub-base by using three adjusting bolts provided in a number of one at each of the three side edges of said tilting base, and wherein a leaf spring is provided between the side edges of said tilting base and said tilting sub-base.

11. A mechanism for tilting a microscope used for an apparatus for producing semiconductor devices, comprising:

a plate on which the microscope is placed, a tilting base to which said plate is secured, the tilting base having three side edges, and a tilting sub-base for supporting said tilting base along the side edges thereof, wherein said tilting base is urged toward said tilting sub-base at all times due to springs interposed between said tilting base and a plurality of support bolts provided along the side edges of said tilting base, and, similarly, said tilting base is supported at three points by said tilting sub-base by using three adjusting bolts provided in a number of one at each of the three side edges of said tilting base, and wherein said springs comprise many initially coned disc springs stacked like the counter balls of an abacus, and wherein a leaf spring is provided between the side edges of said tilting base and said tilting sub-base.

* * * * *